Dec. 10, 1946.  A. KALITINSKY  2,412,341
MOUNTING FOR COOLANT TUBES
Filed March 27, 1945  2 Sheets-Sheet 2
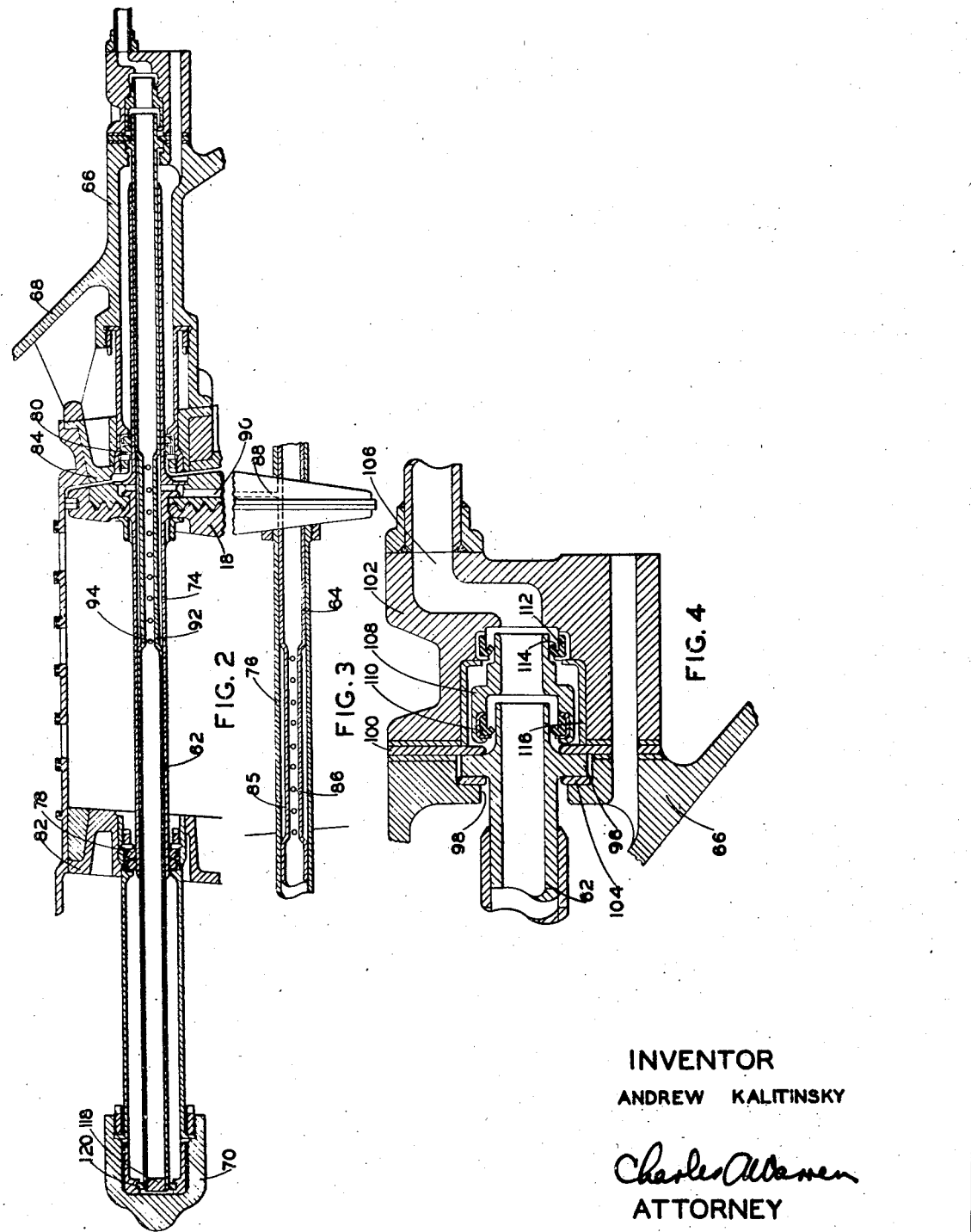
INVENTOR
ANDREW KALITINSKY
ATTORNEY Patented Dec. 10, 1946

2,412,341

UNITED STATES PATENT OFFICE 2,412,341

MOUNTING FOR COOLANT TUBES

Andrew Kalitinsky, Eagleville, Conn., assignor to United Aircraft Corporation, East Hartford, Conn., a corporation of Delaware Application March 27, 1945, Serial No. 585,163

6 Claims. (Cl. 123—176)

This invention relates to a mounting for tubes, such as coolant tubes, extending between the stationary parts of a free-piston unit and the reciprocating piston assembly.

In circulating coolant through the piston assembly, the connection from the stationary cylinders to the piston has been made by telescoping tubes through which coolant might be pumped into and out of the piston assembly, as shown, for example, in the copending Ledwith application, Serial No. 585,160, filed March 27, 1945. The tight fit of the tubes to minimize leakage has necessitated precise alignment of the stationary and reciprocating tubes in order to prevent the tubes from binding during operation of the unit. The different thermal expansions of the several parts of the unit during the operation may, however, cause enough misalignment to cause binding or excessive wear on the tubes. A feature of this invention is an arrangement by which the coolant tubes may have appreciable movement in the part or parts in which they are mounted to correct any misalignment.

In making the coolant tube mounting sufficiently flexible to allow for lateral movement of the tube, possibilities for leakage of the coolant especially if the coolant is circulating under pressure, are greatly increased. One feature of this invention is a connection for the stationary end of the tube which will have a tight connection with the tube within the range of lateral movement permitted by the mounting of the tube.

Other objects and advantages will be apparent from the specification and claims, and from the accompanying drawings which illustrate an embodiment of the invention.

Fig. 2 is a sectional view in another plane showing a mounting for the coolant tube.

Figure 1:
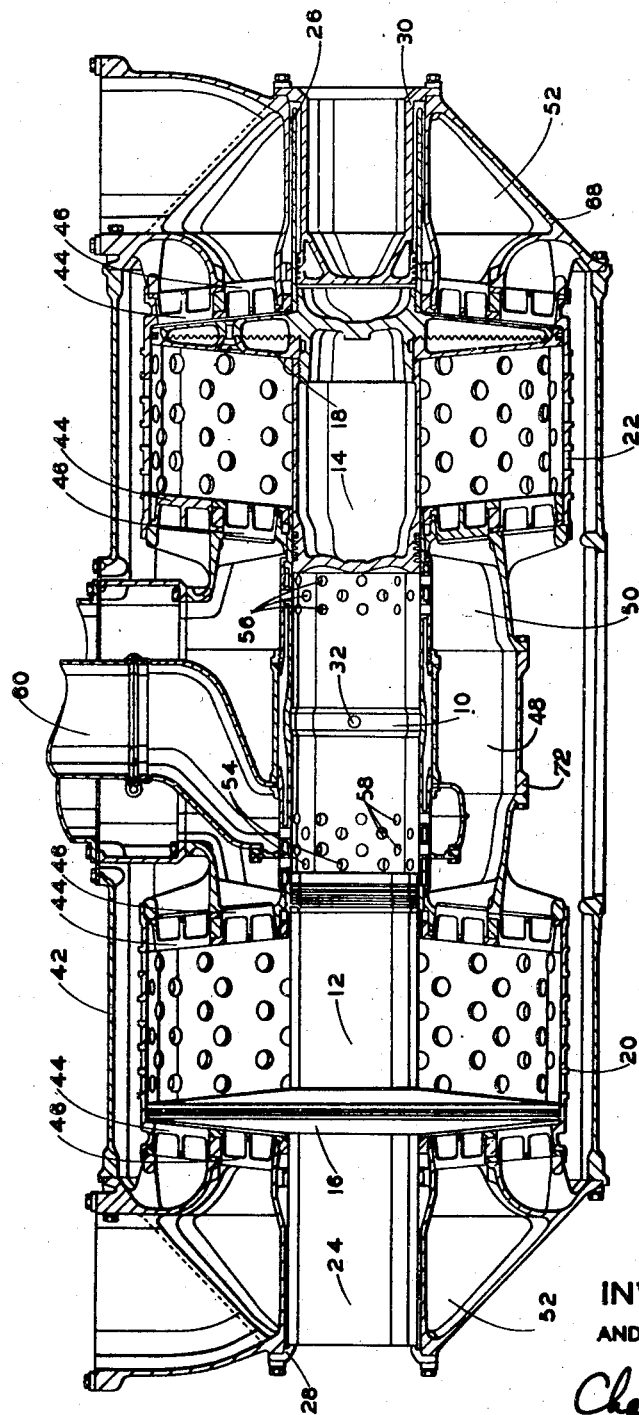
Fig. 1 is a sectional view through the free-piston unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assembly. The sleeves in combination with stationary pistons 28 and 30 form air spring cylinders.

The pistons are moved apart by the burning of fuel injected into engine cylinder 10 through one or more nozzles 32. Air compressed in the air spring cylinders on the power stroke returns the piston assembly. The pistons are always maintained at equal distances from the center of the engine cylinder by a linkage which may include racks extending from the piston assemblies and meshing with a pinion, not shown.

Intake manifold 42, which extends around the compressor and engine cylinders, conducts air to intake valves 44 in the heads of the compressor cylinders, through which air automatically enters at opposite ends of the cylinders. Compressed air leaves the cylinders through discharge valves 46, also at opposite ends of the compressor cylinders and passes into a center scavenge chamber 48 and end chambers 50 and 52. These chambers may be connected by a scavenge manifold, not shown.

Compressed gas from the scavenge chambers enters engine ports 54 and 56 which are uncovered by pistons 12 and 14 at the end of the power stroke, thereby permitting air to be blown through the engine cylinder. Gas in the engine cylinders is discharged through exhaust ports 58 into exhaust manifold 60.

As shown in Fig. 2, coolant is circulated through the piston by means of parallel tubes 62 and 64, Fig. 2, the ends of which may be supported by stationary parts of the unit, as for example, the bracket 66 which may be integral with the end cap 68 and by the bracket 70 which may form a part of the wall 72, Fig. 1, of the central scavenge member.

The tubes 62 and 64 fit within tubes 74 and 76 mounted in the compressor piston. Seals 78 and 80 in the inner and outer heads 82 and 84 of the compressor cylinder prevent leakage of air from the cylinder past the tubes. Tubes 74 and 76 are long enough, as shown, so that they are always in contact with the seals.

The tube 64 may have a reduced portion 85 extending from a point adjacent the inner cylinder head 82 to a point midway of the cylinder so that coolant within tube 64 may pass through openings 86 in the tube and thence into the passage 88 in the piston. Coolant from passage 88 flows through the compressor piston and through a chamber, not shown, in the engine piston and is discharged through a passage 90 also in the compressor piston. The outlet tube 62 has a reduced portion 92 which communicates with the passage 90 during the outer half of the piston reciprocation. Openings 94 provide for a flow of coolant into the tube 62. The above structure is described in the Ledwith application, Serial No. 585,160, above referred to, and is not, in itself, a feature of this invention.

In accordance with this invention, the coolant tube is mounted in such a way that it is free to move laterally to a limited amount in order to compensate for misalignment of the parts and also to accommodate changes in the position of the parts resulting from the thermal expansion during operation. To accomplish this, the tube 62 has a flange 96 fitting between a shoulder 98 on the bracket 66 and a disk 100 clamped between the end of the bracket 66 and a housing 102 mounted on the end of the bracket. Clearance is provided between the disk 100 and the tube to permit the tube to move laterally and the shoulder 98 terminates at a point spaced from the tube so that a limited amount of lateral movement for the tube may be available. A ring 104 may be placed on the flange 96 and the shoulder 98 to eliminate end play in the tube.

To prevent coolant from leaking around the tube, the end of the tube is connected to a passage 106 in the housing 102 by a flexible connection or sealing device which includes a sleeve 108 having on its inner surface a resilient seal 110 which engages with the outer surface of the tube and is preferably arranged so that pressure acting on the seal will increase the sealing action. Adjacent the outer end of the sleeve 108, the housing 102 has a flexible seal 112 formed of a ring of rubber or a similar material having an inwardly extending rib 114 extending toward the outer end of the sleeve in such a manner that the pressure of coolant acting on the rib will increase the sealing engagement with the sleeve. The seal 112 may be clamped in place by a ring 116 which surrounds and is radially spaced from the sleeve.

The inner end of tube 62 which has a plug 118 may be supported by a resilient gasket 120 which will allow a limited lateral movement for the tube. The seals 78 and 80, which are located in the cylinder heads 82 and 84 and extend around and engage the tube 74, also have a limited amount of lateral movement to permit the lateral movement of tube 62 to take place. Thus, the tube 62 will adjust itself to any misalignment of the parts without causing any leakage.

With this arrangement, the mounting for the tube may be sufficiently free to permit the desired lateral movement of the tube in compensating from misalignment and at the same time the sleeve 108 in conjunction with the seals 110 and 112 provides a substantially liquid-tight connection between the passage 106 and the tube so that no substantial amount of coolant will be lost past the tube mounting.

It is to be understood that the invention is not limited to the specific embodiment herein illustrated and described, but may be used in other ways without departure from its spirit as defined by the following claims.

I claim:

1. In a free-piston unit, an engine cylinder and piston, a compressor cylinder and piston, said pistons being connected to move as a unit, a tube mounted on and extending from one of said pistons, a stationary tube telescoping with said first tube, said tubes providing a connection for the circulation of coolant through the piston, and a supporting structure for said tube having a passage therein, said structure and stationary tube having cooperating means for supporting the tube in such a manner as to provide a limited amount of lateral movement for the tube.

2. In a free-piston unit, an engine cylinder and piston, a compressor cylinder and piston, said pistons being connected to move as a unit, a tube mounted on and extending from one of said pistons, a stationary tube telescoping with said first tube, said tubes providing a connection for the circulation of coolant through the piston, and a supporting structure for said tube having a passage therein for coolant, said structure and stationary tube having cooperating means for supporting the tube in such a manner as to provide a limited amount of lateral movement for the tube, and a sealing device on the end of the tube to minimize leakage of the fluid past said cooperating means.

3. In a free-piston unit, an engine cylinder and piston, a compressor cylinder and piston, said pistons being connected to move as a unit, a tube mounted on and extending from one of said pistons, a stationary tube telescoping with said first tube, said tubes providing a connection for the circulation of coolant through the piston, a supporting structure for said tube having a coolant passage therein, said structure and stationary tube forming a cooperating means for supporting the tube in such a manner as to provide a limited amount of lateral movement for the tube, and a flexible connection between the passage and the end of the tube.

4. In a free-piston unit, an engine cylinder and piston, a compressor cylinder and piston, said pistons being connected to move as a unit, a tube mounted on and extending from one of said pistons, a stationary tube telescoping with said first tube, said tube providing a connection for the circulation of coolant through the piston, a supporting structure for said tube having a coolant passage therein, said structure and stationary tube forming a cooperating means for supporting the tube in such a manner as to provide a limited amount of lateral movement for the tube, and a flexible connection between the passage and the end of the tube, said connection including a sleeve, and a seal between the ends of the sleeve and the tube and passage respectively.

5. In a free-piston unit, an engine cylinder and piston, a compressor cylinder and piston, said pistons being connected to move as a unit, a tube mounted on and extending from one of said pistons, a stationary tube telescoping with said first tube, said tube providing a connection for the circulation of coolant through the piston, a supporting structure for said tube having a coolant passage therein, said structure and stationary tube forming a cooperating means for supporting the tube in such a manner as to provide a limited amount of lateral movement for the tube, and a flexible connection between the passage and the end of the tube, said connection including a sleeve, a sealing ring at one end engaging with the tube, and a second sealing ring engaging with the opposite end of said sleeve.

6. In a free-piston unit, an engine cylinder and piston, a compressor cylinder and piston, said pistons being connected to move as a unit, a tube mounted on and extending from one of said pistons, a stationary tube telescoping with said first tube, said tube providing a connection for the circulation of coolant through the piston, a supporting structure for said tube having a coolant passage therein, said structure and stationary tube forming a cooperating means for supporting the tube in such a manner as to provide a limited amount of lateral movement for the tube, and a flexible connection between the passage and the end of the tube, said connection including a sleeve, a sealing ring at one end engaging with the tube, and a second sealing ring engaging with the opposite end of said sleeve, said sealing rings being constructed and arranged to permit a relative movement between the tube and the passage without causing leakage past the seals.

ANDREW KALITINSKY.